United States Patent
Labuschagne et al.

(10) Patent No.: US 6,923,294 B2
(45) Date of Patent: Aug. 2, 2005

(54) LOCKABLE WHEEL

(76) Inventors: Adriaan Zagarias Albertus Labuschagne, A408 Sea Spray, Marine Drive, Table View 7741, Cape Town (ZA); Renier Percy Labuschagne, E28 Pentz Drive, Table View, 7741, Cape Town (ZA)

( * ) Notice: Subject to any disclaimer, the term of this patent is extended or adjusted under 35 U.S.C. 154(b) by 0 days.

(21) Appl. No.: 10/469,020

(22) PCT Filed: Feb. 27, 2002

(86) PCT No.: PCT/IB02/00562

§ 371 (c)(1),
(2), (4) Date: Jan. 26, 2004

(87) PCT Pub. No.: WO02/068218

PCT Pub. Date: Sep. 6, 2002

(65) Prior Publication Data

US 2004/0112101 A1  Jun. 17, 2004

(30) Foreign Application Priority Data

Feb. 27, 2001  (ZA) .......................... 2001/1634

(51) Int. Cl.[7] .............................................. B62C 7/02
(52) U.S. Cl. .......................................... 188/69; 188/19
(58) Field of Search ............................ 188/17, 19, 20, 188/26, 31, 68, 69, 110, 111, 265; 16/35 R; 192/35, 38; 475/204

(56) References Cited

U.S. PATENT DOCUMENTS

| 3,366,201 A | | 1/1968 | Pesta ........................... 188/110 |
|---|---|---|---|
| 3,590,962 A | | 7/1971 | Parker et al. ................ 188/111 |
| 4,527,680 A | * | 7/1985 | Sato ............................ 192/215 |
| 5,320,586 A | * | 6/1994 | Baxter, Jr. .................... 475/88 |
| 6,117,040 A | * | 9/2000 | Watterodt et al. ........... 475/299 |
| 6,341,671 B1 | * | 1/2002 | Ebersole ..................... 188/2 F |
| 6,579,205 B2 | * | 6/2003 | Williams ..................... 475/204 |
| 6,622,837 B2 | * | 9/2003 | Ochab et al. ................. 192/35 |

* cited by examiner

Primary Examiner—Chris Schwartz
(74) Attorney, Agent, or Firm—Wood, Herron & Evans, L.L.P.

(57) ABSTRACT

A lockable shopping cart wheel (10) comprises a plastics hollow casing (12), an axle (22) on which the casing is rotatably mounted and a resetable locking mechanism that is mounted on the axle in the casing. The casing has an end wall (14), a cylindrical wall (16) having a tire (20) and an end wall (18). The locking mechanism includes a locking plate (34) which is axially displaceable but rotationally fixed to the axle (22). A coil spring (38) acts between wall (18) and plate (34) urging it towards wall (14). The plate (34) defines formations which can engage the wall (16) thereby locking the wheel. Between the plate (34) and wall (14) are three gear wheels (44.1), (44.2) and (44.3) which meter the number of revolutions of the casing and release the plate (34) when a predetermined number of revolutions has taken place. The plate (34) is ferromagnetic, allowing the plate to be displaced against the spring action to reset the locking mechanism by using a magnet from outside the casing.

4 Claims, 11 Drawing Sheets

LOCKABLE WHEEL

FIELD OF INVENTION

THIS INVENTION relates to a lockable wheel.

More particularly, the invention relates to a lockable wheel of the type that is used for shopping carts or trolleys, and is provided with a locking mechanism for locking the wheel after the cart has travelled a predetermined distance, thereby immobilising the cart. The provision of a shopping cart with such a wheel will prevent or discourage shoppers from removing the cart beyond the predetermined distance from the shopping centre.

SUMMARY OF INVENTION

According to the invention there is provided a lockable wheel which comprises an axle;

a ground-engaging hollow casing that is mounted for rotation on the axle; and a resetable locking mechanism that is mounted on the axle and housed in the casing, the locking mechanism comprising: a locking element which is axially displaceable in the casing between a first position in which it permits rotation of the casing with respect to the axle and a second position in which it engages with the axle and the casing to lock the casing against rotation with respect to the axle; biasing means for biasing the locking element towards the second position; and metering means for metering the number of revolutions of the casing after the locking mechanism has been reset and releasing the locking element for displacement to the second position when a predetermined number of revolutions of the casing has taken place; the locking element being of a ferro-magnetic material so that the locking element can be displaced against the bias of the biasing means to reset the locking mechanism by the application of a magnetic field from outside the casing.

The metering means may comprise a train of at least two gear wheels housed in the hollow casing, with a first of the gear wheels being advanced by each revolution of the casing, and a second of the gear wheels being advanced by each revolution of the first gear wheel.

The metering means may comprise a train of three gear wheels, the train including a third gear wheel which is advanced by each revolution of the second gear wheel.

Each gear wheel may be provided with an eccentrically arranged element of ferromagnetic material, whereby the gear wheel can be reset from outside of the casing to a predetermined rotational position with respect to the axle, upon resetting of the locking mechanism, by the application of a magnetic field.

BRIEF DESCRIPTION OF THE DRAWINGS

The invention will now be described in more detail, by way of example, with reference to the accompanying drawings. In the drawings.

DESCRIPTION OF THE PREFERRED EMBODIMENT

Figure 3:
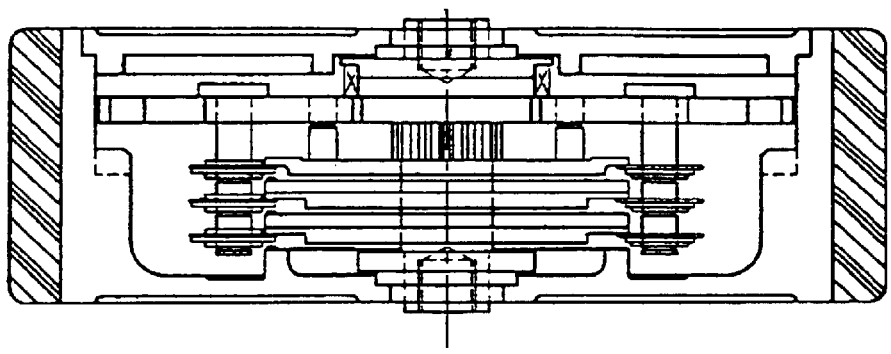
FIG. 3 is a section similar to FIG. 1, showing the locking mechanism in a resetting condition.

Referring now to the drawings in more detail, reference numeral 10 generally indicates a shopping cart wheel which comprises a hollow casing 12 which has an end wall 14 on one side of the wheel and a cylindrical wall 16 which extends from said one side of the wheel to the other. On the other side of the wheel there is a removable end wall 18. On the outside of the cylindrical wall 16 there is a tyre 20. The casing 12, the end wall 18, and the tyre 20 are of a non-magnetic material such as, for example, a suitable plastics material.

The wheel further comprises a fixed axle 22, the axle being a steel component which has a threaded socket 24 at each opposite end thereof, the threaded sockets being able to receive the threaded fasteners screws whereby the wheel is mounted on a wheel bracket (not shown). The assembly comprising the casing 12, the end wall 18, and the tyre 20 are rotatably mounted on the axle 22 via a pair of bearing bushes 26.1 and 26.2, which may conveniently be of Teflon or the like material. The bushing 26.1 is adjacent the end wall 14 and the bushing 26.2 adjacent the end wall 18.

The axle 22 comprises a cylindrical section 28, a splined section 30, and a collar 32.

Inside the casing 12, in the space between the end walls 14 and 18, there is a locking plate 34. The locking plate has an internally splined opening 36 therein, whereby it cooperates with the splined section 30 of the axle. The locking plate 34 is therefore axially displaceable but rotationally fixed with respect to the axle 22. Between the collar 32 and the locking plate 34 there is a coil spring 38, the coil spring acting to urge the locking plate away from the end wall 18 and towards the end wall 14.

Figure 1:
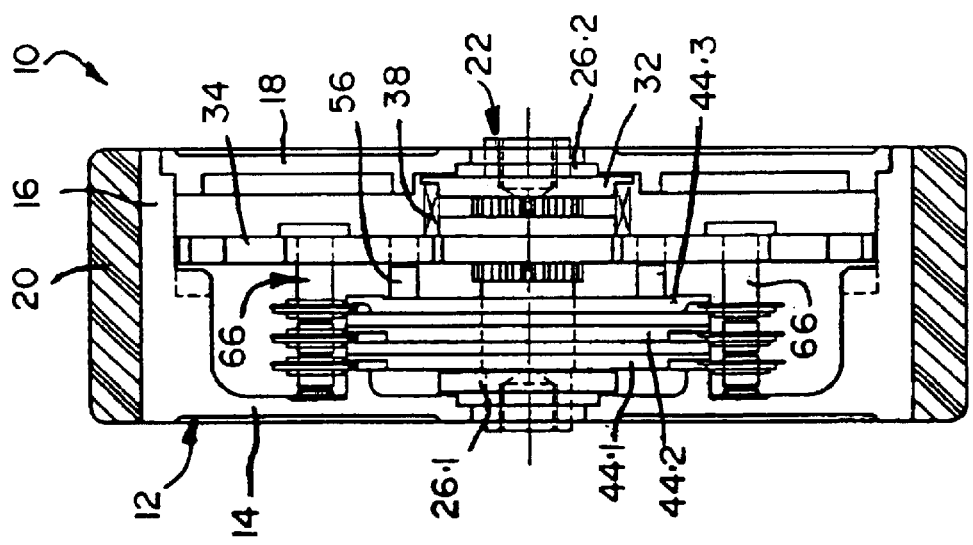
FIG. 1 is an axial section of a shopping cartwheel in accordance with the invention, showing the locking mechanism thereof in a normal, unlocked condition.
Figure 4:
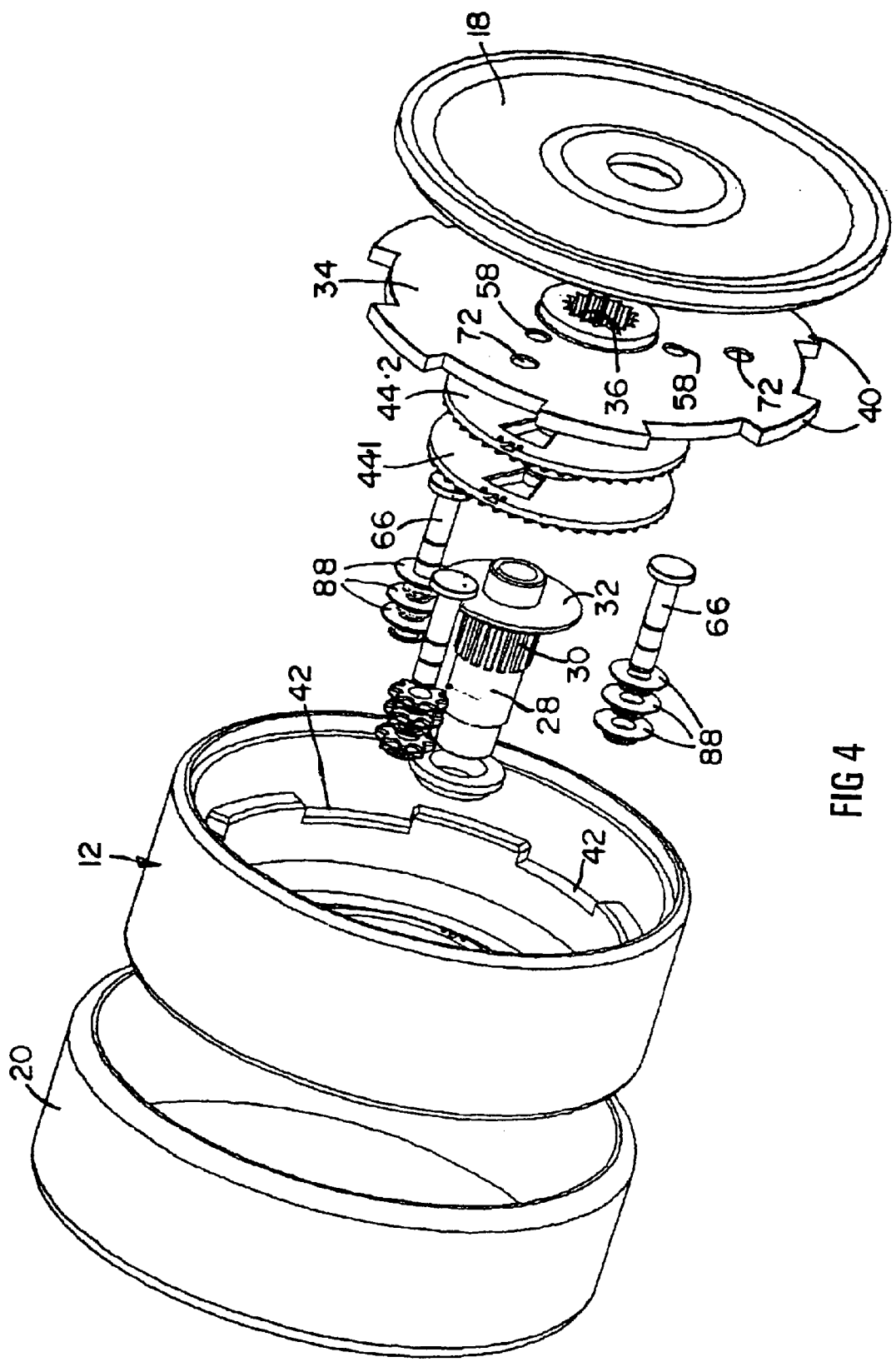
FIG. 4 is an exploded three-dimensional view of the wheel.
Figure 5:
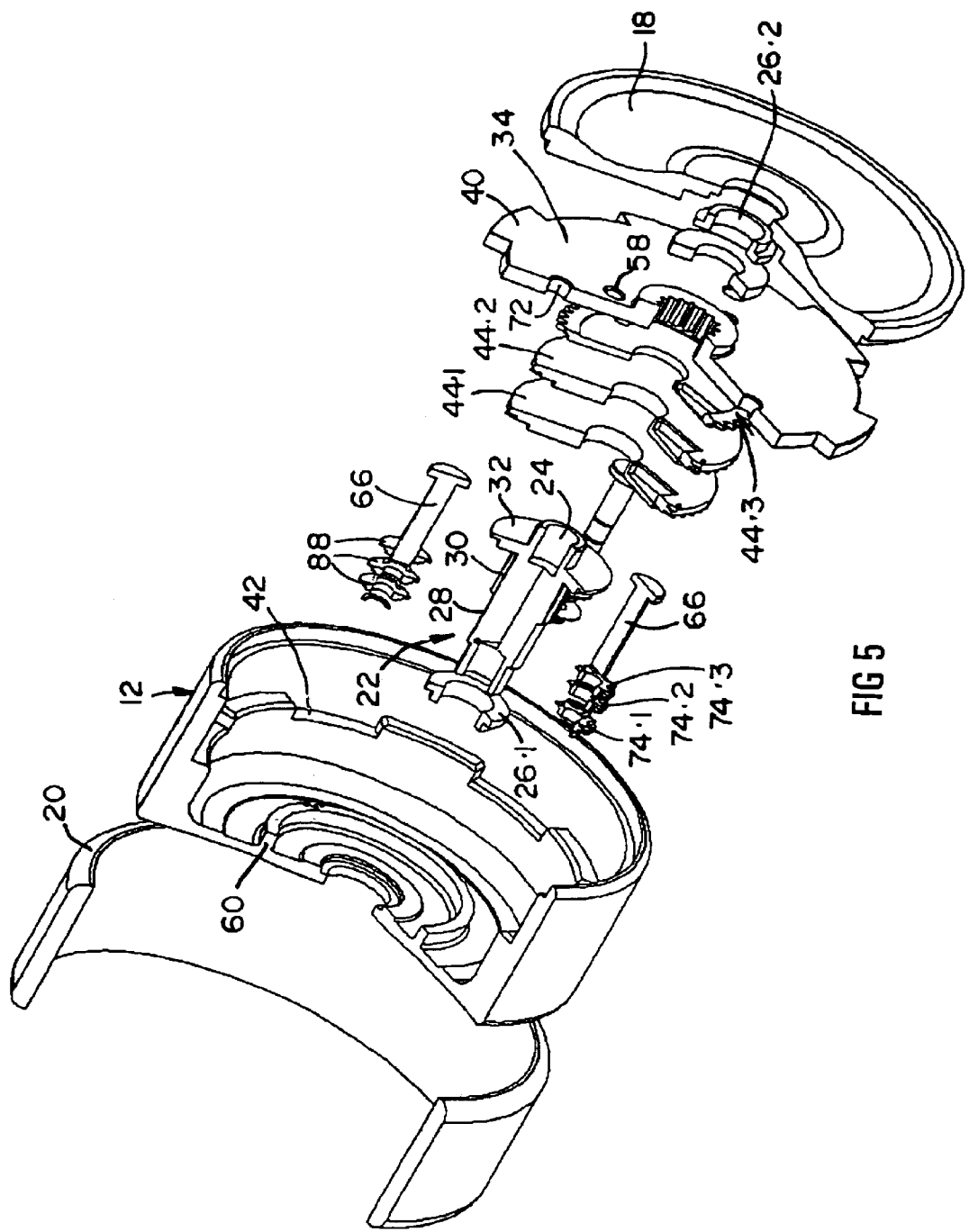
FIG. 5 is a view similar to FIG. 4, but showing the various component parts of the wheel in section.
Figure 6:
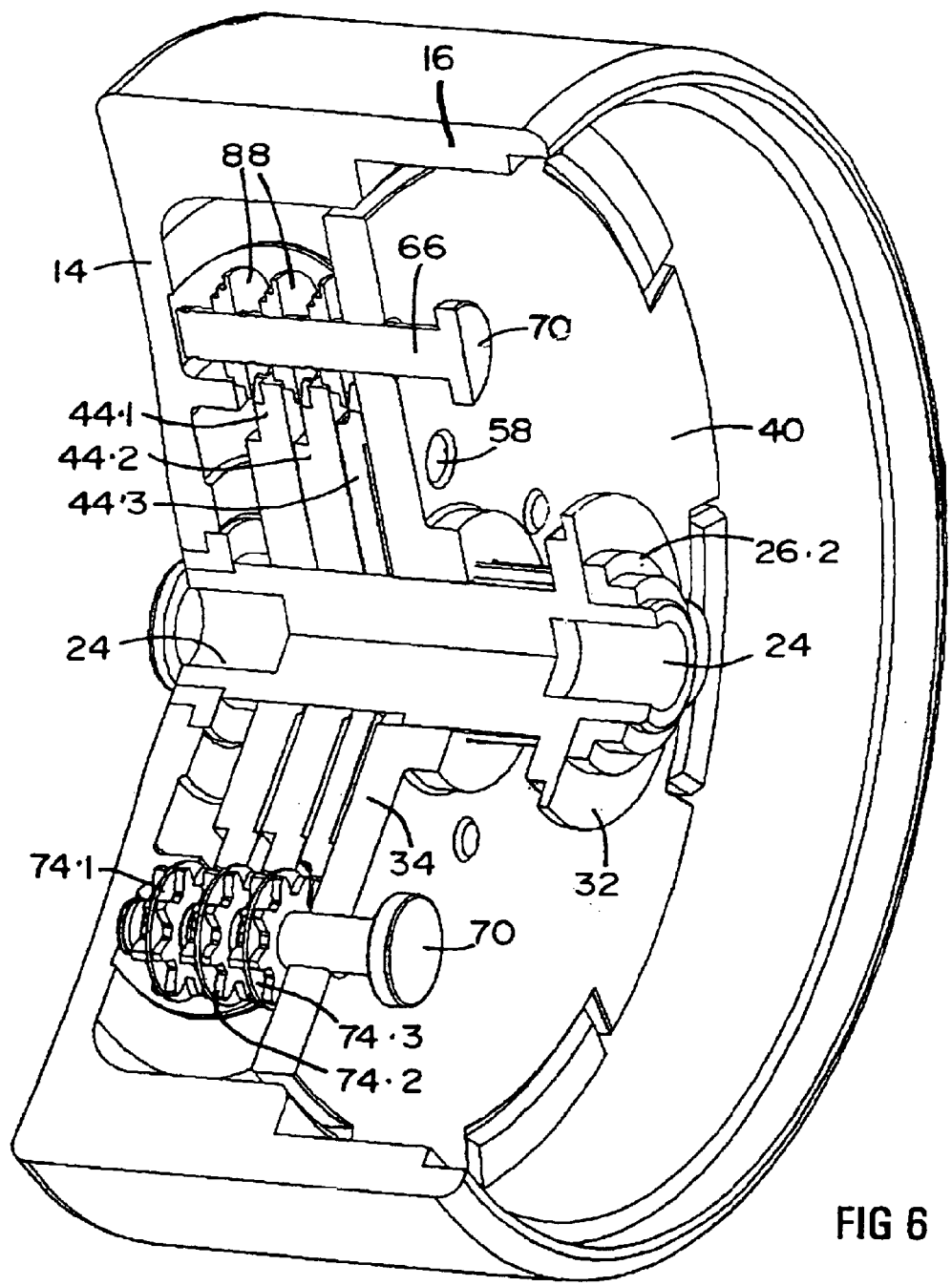
FIG. 6 is a sectioned three-dimensional view of the wheel, shown in an assembled condition, with the one end wall thereof having been removed, and with the locking mechanism thereof in the locked condition.
Figure 7:
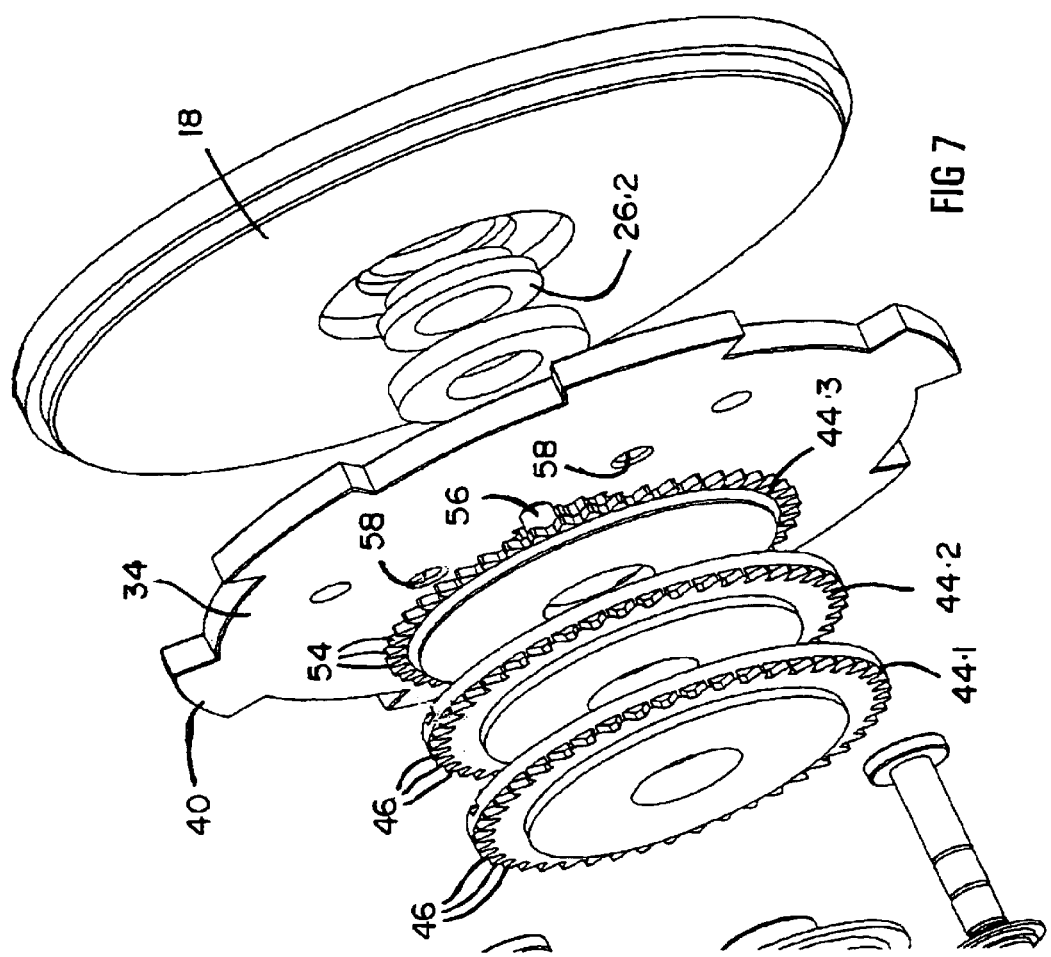
FIGS. 7 to 13 are exploded 3-dimensional views of various parts of the mechanism.
Figure 8:
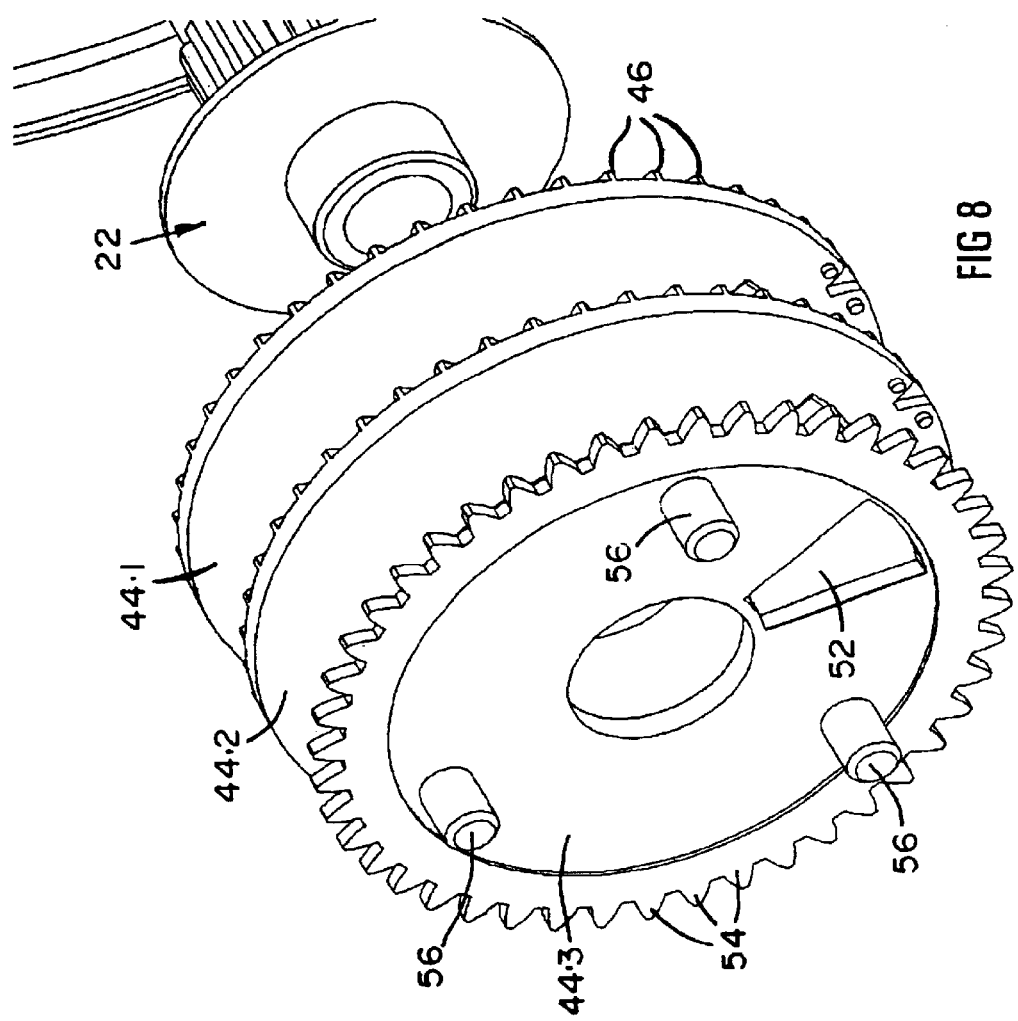
Figure 9:
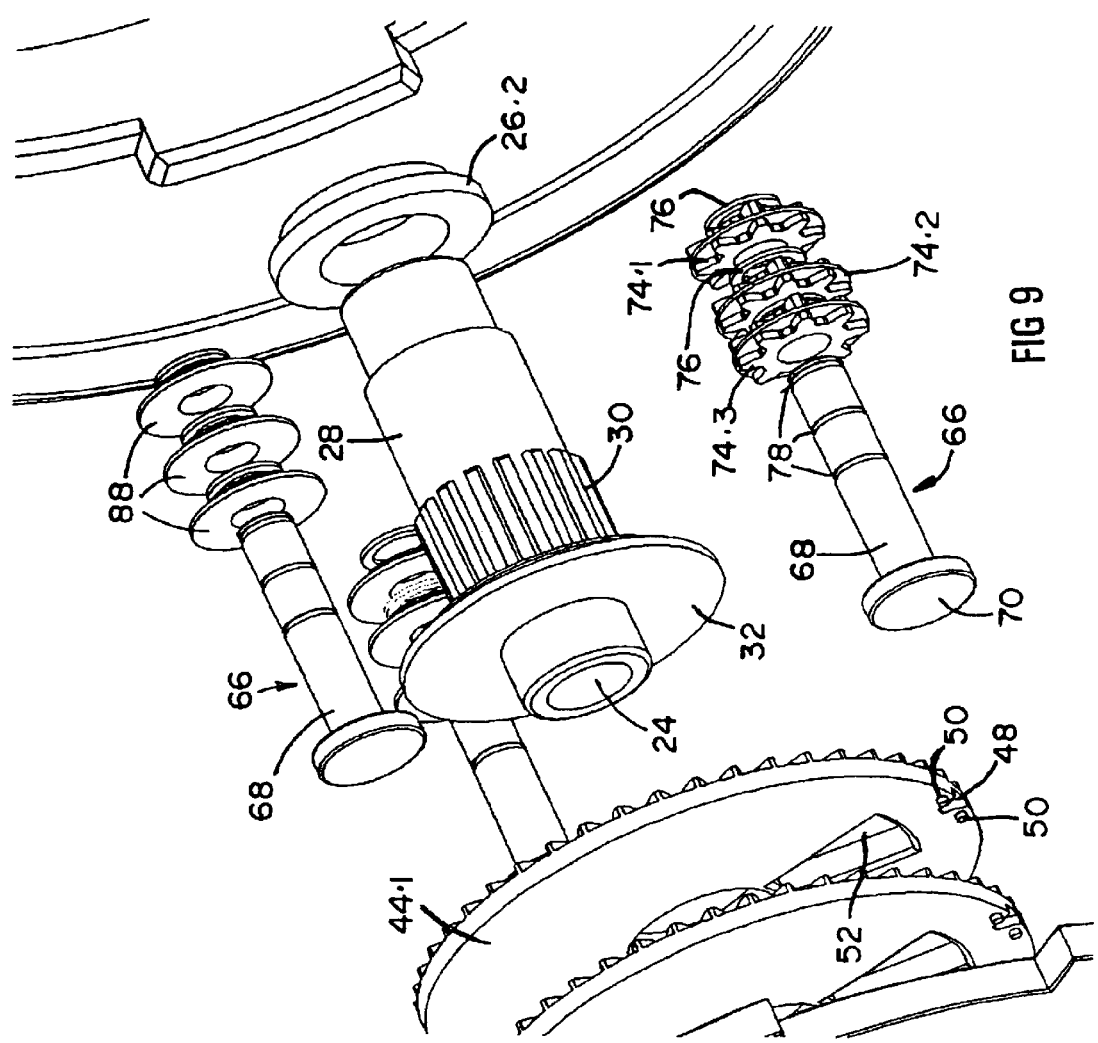
Figure 10:
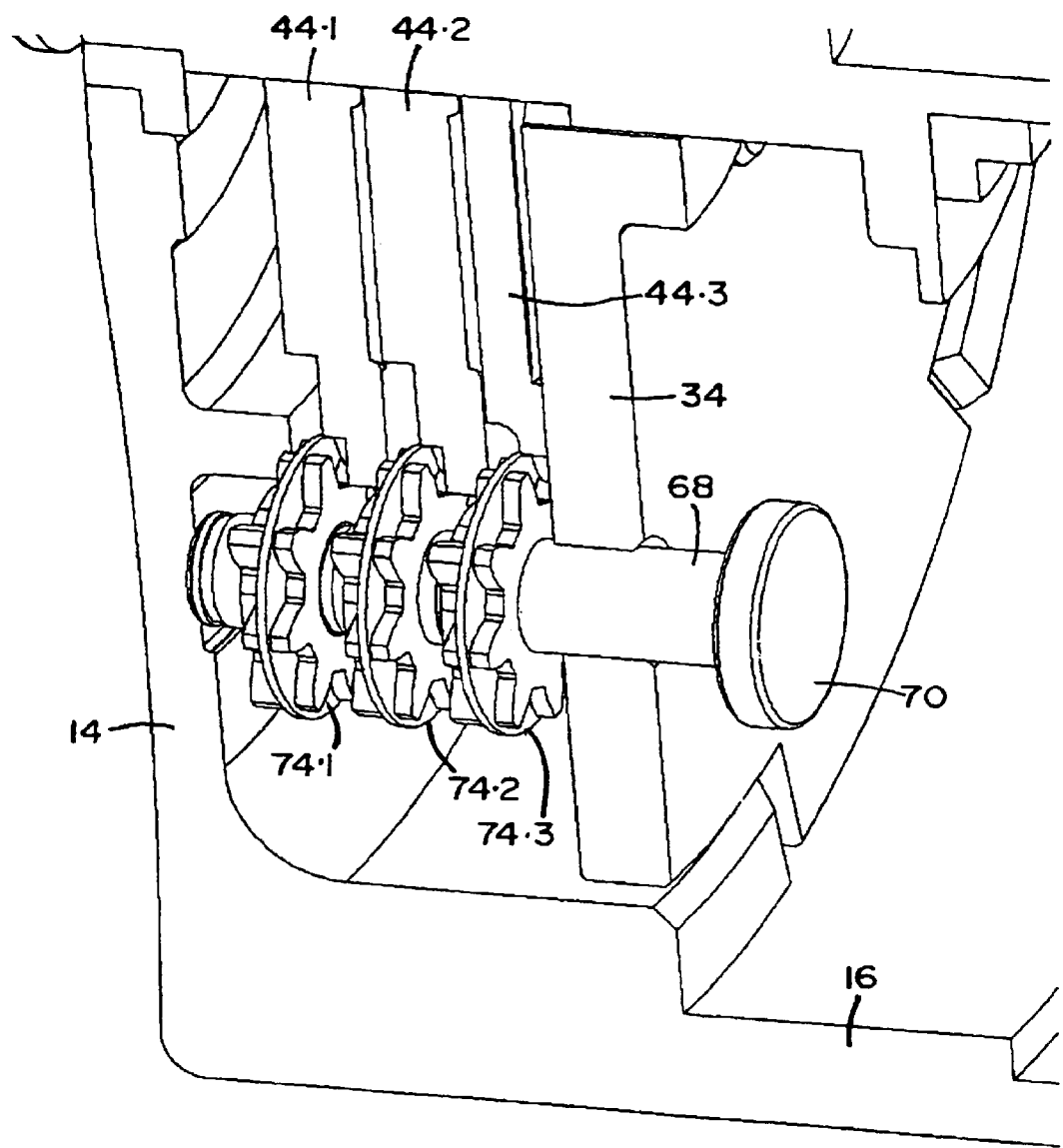
Figure 11:
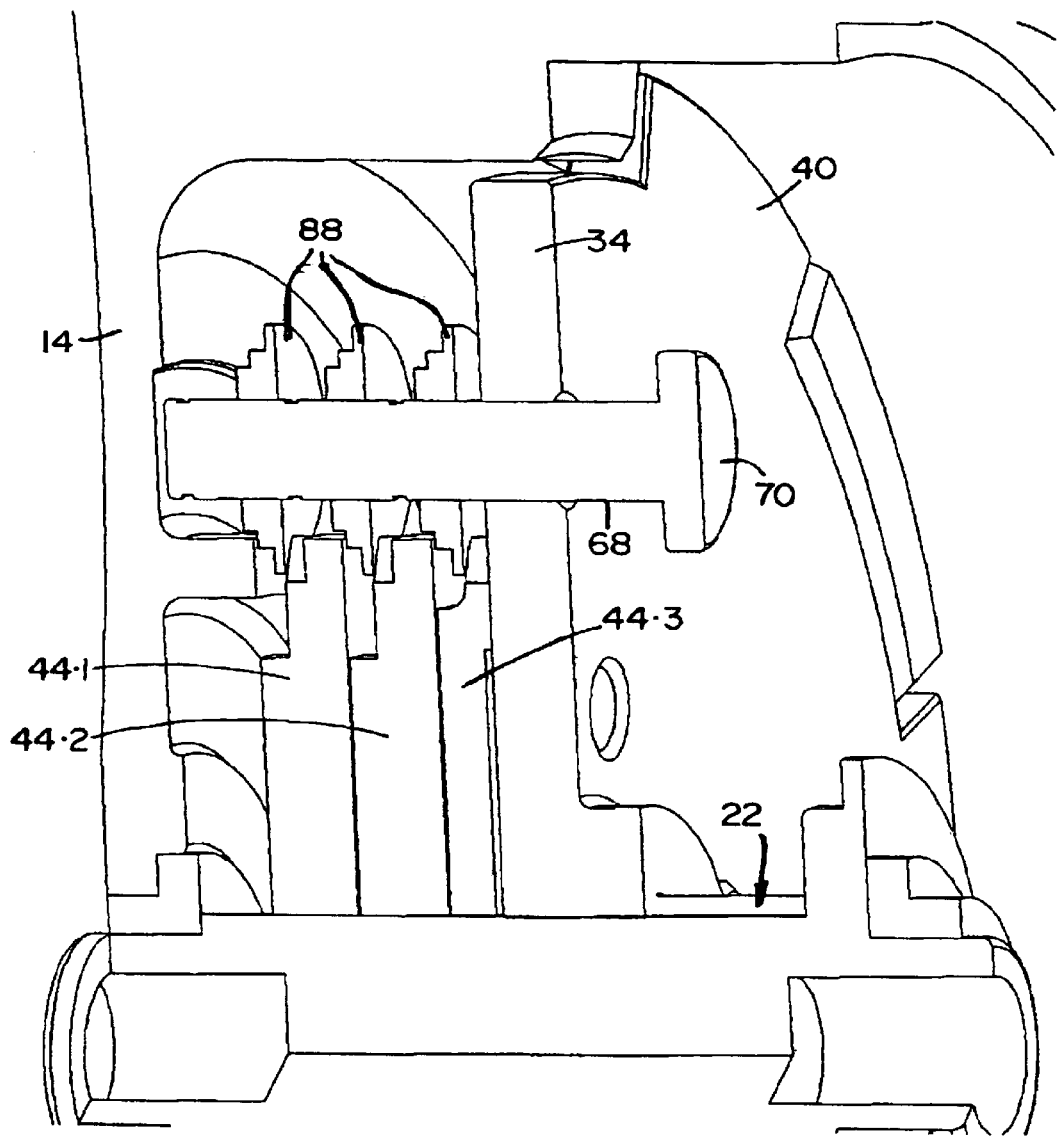
Figure 12:
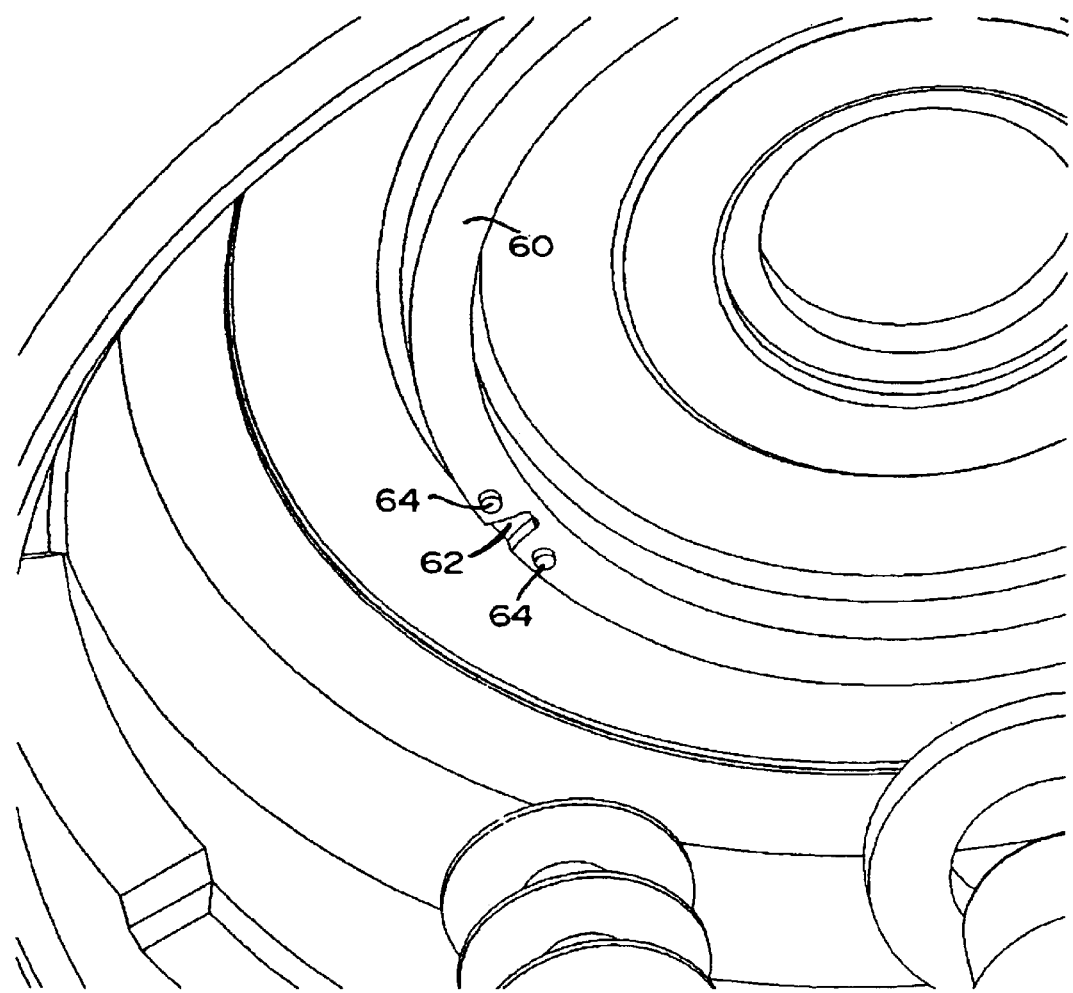
Figure 13:
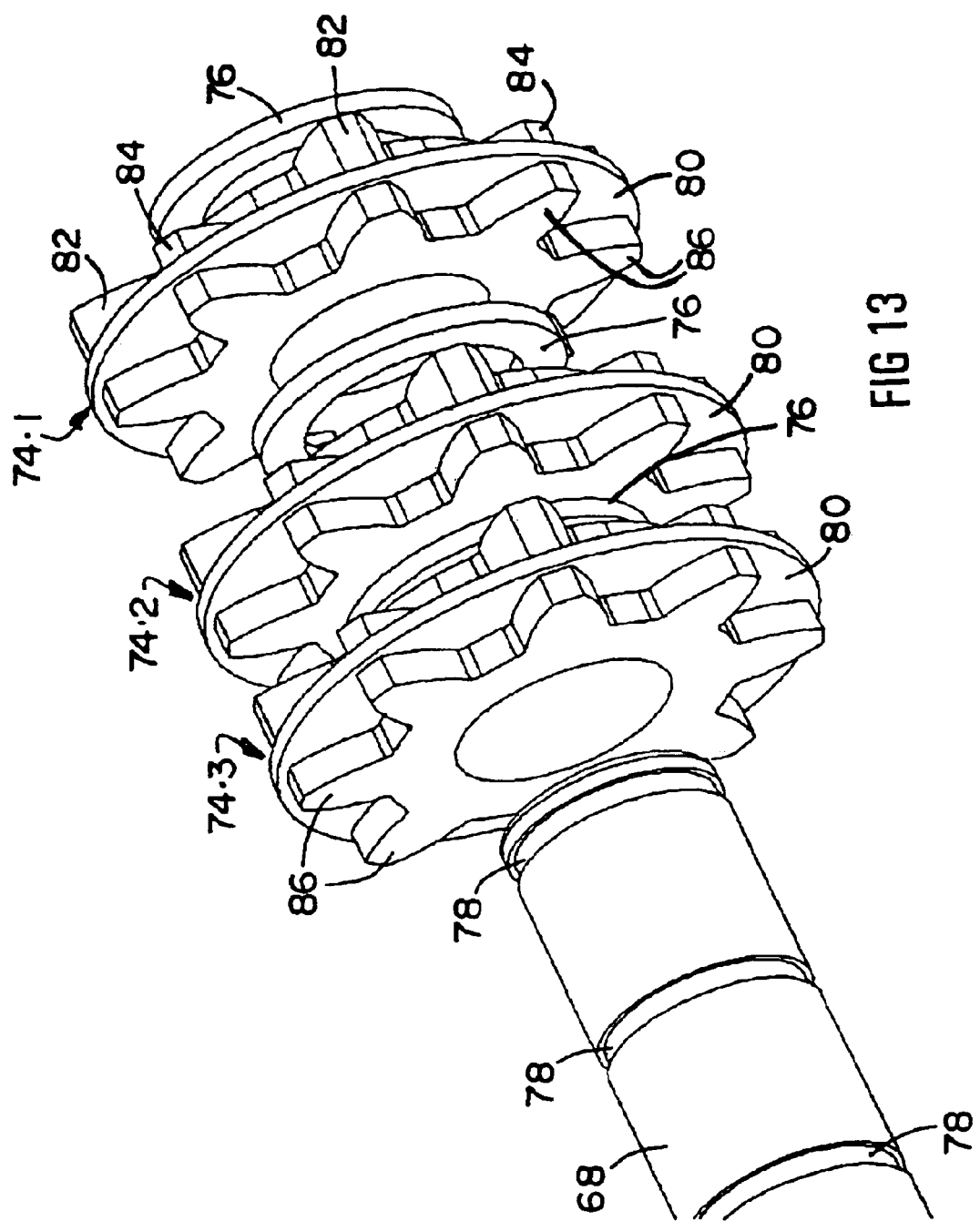

The locking plate 34 has a number of circumferentially spaced teeth 40 on the periphery thereof. These teeth 40 are able to enter into recesses 42 which are provided in a shoulder on the inside of the cylindrical wall 16. When the teeth 40 have entered into the recesses 42, the assembly of casing 12, end wall 18, and tyre 20 is prevented from rotating, thus locking the wheel. During normal operation, however, as illustrated in FIG. 1, the locking plate 34 is in a position in which the coil spring 38 is compressed and the teeth 40 are disengaged from the cylindrical wall 16.

In the space between the locking plate 34 and the end wall 14 there are three axially spaced gear wheels, namely a first gear wheel 44.1, a second gear wheel 44.2, and a third gear wheel 44.3. The gear wheels 44.1 to 44.3 are rotatable and also axially displaceable on the cylindrical section 28 of the axle.

The first gear wheel 44.1 has gear teeth 46 formed in one of the faces thereof, i.e. on that side of the gear wheel which faces the end wall 14. On the opposite side thereof it has a single notch 48 and a pair of pins 50, one on each opposite side of the notch. The gear wheel is of a strong, non-magnetic material. Nylon 6 is a suitable material. In one of the faces thereof there is a sector-shaped cavity 52 in which there is accommodated a block of steel or other ferromagnetic material (not shown in the drawings).

The second gear wheel 44.2 is of the same construction as the first gear wheel 44.1. The third gear wheel 44.3 differs from the gear wheels 44.1 and 44.2 in that it has gear teeth 54 on the periphery thereof instead of in one of the axially facing sides thereof, in that it does not have the notch 48 and pins 50, and in that it is provided, on that side thereof which faces the locking plate 34, with three circumferentially spaced locking pins 56.

In the locking plate 34 there are three locking holes 58, whose arrangement is such that when the gear wheel 44.3 is in a predetermined rotational position with respect to the locking plate, the locking pins 56 can enter into the locking holes, thus allowing the locking plate to move axially towards the gear wheel 44.3.

The end wall 14 has a circular ridge 60 which protrudes axially into the space between the end walls 14 and 18. In this ridge there is a single notch 62, and it has a pair of pins 64 on each opposite side of the notch. The arrangement of the notch 62 and the pins 64 is similar to the notch 48 and pins 50 of the gear wheels 44.1 and 44.2.

The locking plate 34 carries three circumferentially spaced lifter pins 66. Each of the lifter pins 66 has a cylindrical shaft 68 and a head 70 at one end of the cylindrical part. The cylindrical shaft 68 is a free sliding fit in a bore 72 in the locking plate 34, the head 70 being on that side of the locking plate which faces the end wall 18.

On that side thereof which is in the space between the locking plate and the end wall 14 each lifter pin 66 carries a series of three elements. In the case of one of the lifter pins 66, these elements are in the form of pinion gears 74.1, 74.2, and 74.3, each of which is rotatable on the cylindrical shaft 68 and is located axially with respect to the pin by means of a circlip 76. The circlips engage with grooves 78 in the cylindrical part. Each of the pinion gears 74.1 to 74.3 has a central, disc-shape part 80. On one side of the disc-shaped part 80, in the axial face thereof, there are teeth 82 and 84. The teeth 82 alternate with the teeth 84, the teeth 82 being axially longer than the teeth 84. The teeth 82 and 84 are arranged to cooperate with the notch 48 and pins 50 (in the case of the pinion gears 74.2 and 74.3) and with the notch 62 and pins 64 (in the case of the pinion gear 74.1). On the other side of the disc-shaped part 80 there are gear teeth 86, these being arranged to mesh with the gear teeth 46 (in the case of the pinion gears 74.1 and 74.2) and with the gear teeth 54 (in the case of the pinion gear 74.3).

The elements on the other two lifter pins 66 are in the form of lifter discs 88 which, like in the case of the pinion gears 74.1 to 74.3, are axially slidable and rotatable on the respective pins, and are held in position by means of circlips 76.

Operation of the wheel will now be described.

When the wheel is in the normal, unlocked condition, as illustrated in FIG. 1, the locking pins 56 are out of register with the locking holes 58. The coil spring 38 urges the locking plate 34 against the ends of the locking pins 56, which in turn urges the gear wheels 44.1, 44.2, and 44.3 axially towards the end wall 14, with the gear wheel 44.1 abutting on the bushing 26.1. Under these conditions the teeth 40 of the locking plate are not entered in the recesses 42, so that the assembly comprising the casing 12, the end wall 18, and the tyre 20 is free to rotate with respect to the axle 22.

For each revolution of the wheel (i.e. the assembly of casing 12, end wall 18, and tyre 20) engagement of the pins 64 with the teeth 84 of the pinion gear 74.1 advances the pinion gear 74.1 through an angle which corresponds to the pitch of the teeth 84. Rotation of the pinion gear 74.1 in turn advances the first gear wheel 44.1. The notch 62, as it passes the pinion gear 74.1, accommodates the corresponding tooth 82, to permit rotation of the pinion gear. Once the notch 62 has moved past the pinion gear the teeth 82 slide along the smooth outer periphery of the ridge 60, and this prevents the pinion gear from rotating.

Likewise, for each revolution of the first gear wheel 44.1, engagement of the pins 50 with the teeth 84 of the pinion gear 74.2 advances the pinion gear 74.2, and this in turn advances the second gear wheel 44.2. The second gear wheel 44.2 in a like manner advances the third gearwheel 44.3. It will be appreciated that the drive train between the casing 12 and the third gearwheel 44.3 provides a very large reduction ratio.

Figure 2:
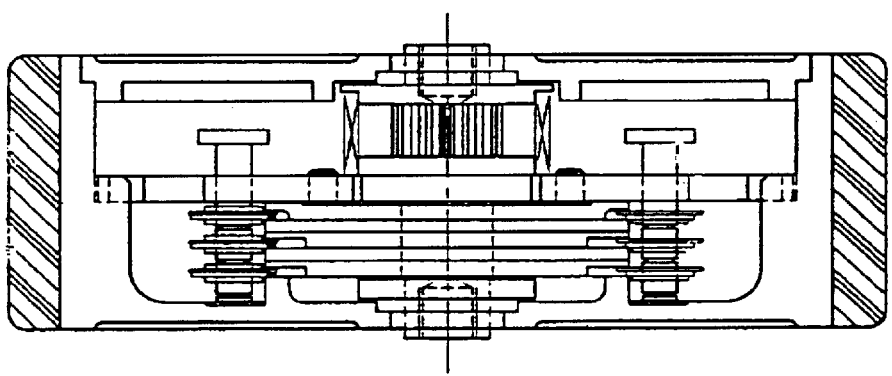
FIG. 2 is a section similar to FIG. 1, showing the locking mechanism in a locked condition.

Rotation of the gearwheel 44.3 will eventually bring the locking pins 56 into register with the locking holes 58. When this has happened, the locking plate 34 will be able to move in the direction of the end wall 14, causing the teeth 40 to enter into the recesses 42 and so lock the wheel. The parts will now be in the positions illustrated in FIG. 2.

To unlock the wheel, two sufficiently strong magnets are required. The first magnet is applied to one side of the wheel, i.e. the side of the end wall 18. This will attract the locking plate 34 (which, as mentioned earlier, is of a ferro-magnetic material) and displace it towards the end wall 18, against the bias of the coil spring 38, and so moves the teeth 40 out of the recesses 42.

Simultaneously, the locking plate 34 displaces the lifter pins 66 towards the end wall 18. This will have the effect of lifting the gear wheels 44.1, 44.2, and 44.3 slightly away from one another and away from the end wall 14. As a consequence of this, the teeth 82 of the pinion gear 74.1 move axially out of contact with the smooth outer circumference of the ridge 60, and those of the pinion gears 74.2 and 74.3 move axially out of contact with the smooth outer circumference of the gear wheels 44.1 and 44.2 respectively. This will allow the pinion gears 74.1 to 74.3 and hence the gear wheels 44.1, 44.2, and 44.3 to rotate freely and independently of one another. The various parts will now be in the positions illustrated in FIG. 3.

The second magnet is applied to the circumference of the wheel. This will cause the gear wheels 44.1, 44.2, and 44.3 to rotate until the ferro-magnetic parts which are in the cavities 52 are at their closest position, rotationally, to the second magnet. This has the effect of resetting the wheel, with the locking pins 56 again being out of register with the locking holes 58. The two magnets can now be removed, causing the parts to return to the positions illustrated in FIG. 1, under action of the coil spring 38. The shopping cart of which the wheel 10 forms part will now be able to travel for a predetermined distance, whereupon it will lock again.

The second magnet can be mounted in a fixed position. For example, it may be mounted below a surface across which the cart can travel. This will ensure that the gear wheels 44.1 to 44.3 will always return to the same rotational positions when the locking mechanism is reset.

The locking holes 58 may be drilled holes. The angular position at which the locking holes 58 are drilled will determine the distance for which the cart can travel after the locking mechanism has been reset, before the wheel locks.

What is claimed is:

1. A lockable wheel which comprises an axle;

a ground-engaging hollow casing that is mounted for rotation on the axle; and a resetable locking mechanism that is mounted on the axle and housed in the casing, the locking mechanism comprising: a locking element which is axially displaceable in the casing between a first position in which it permits rotation of the casing with respect to the axle and a second position in which it releasably engages with the axle and the casing to lock the casing against rotation with respect to the axle; biasing means for biasing the locking element towards the second position; and metering means for metering the number of revolutions of the casing after the locking mechanism has been reset from a locked condition wherein the locking element is in its second position to an unlocked condition wherein the locking element is in its first position and releasing the locking element for displacement to the second position when a predetermined number of revolutions of the casing has taken place, the metering means comprising a train of at least three gear wheels housed in the hollow casing, with a first of the gear wheels being advanced by each revolution of the casing, and a second of the gear wheels being advanced by each revolution of the first gear wheel and a third of the gear wheels being advanced by each revolution of the second gear wheel.

2. A lockable wheel as claimed in claim 1, wherein the locking element is of ferromagnetic material so that the locking element can be displaced against the bias of the biasing means to reset the locking mechanism by the application of a magnetic field from outside the casing.

3. A lockable wheel as claimed in claim 2, wherein each gear wheel is provided with an eccentrically arranged element of ferromagnetic material, whereby the gear wheel can be reset from outside of the casing to a predetermined rotational position with respect to the axle, upon resetting of the locking mechanism, by the application of a magnetic field.

4. A lockable wheel as claimed in claim 3, wherein each gear wheel is provided with an eccentrically arranged element of ferro-magnetic material, whereby the gear wheel can be reset from the outside of the casing to a predetermined rotational position with respect to the axle, upon resetting of the locking mechanism, by the application of a magnetic field.

* * * * *